(12) United States Patent
Yamada

(10) Patent No.: US 9,035,489 B2
(45) Date of Patent: May 19, 2015

(54) CONTROL APPARATUS AND CONTROL METHOD FOR VEHICLE

(75) Inventor: Kenji Yamada, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 13/877,268

(22) PCT Filed: Oct. 20, 2010

(86) PCT No.: PCT/JP2010/068447
§ 371 (c)(1),
(2), (4) Date: Apr. 1, 2013

(87) PCT Pub. No.: WO2012/053067
PCT Pub. Date: Apr. 26, 2012

(65) Prior Publication Data
US 2013/0200696 A1     Aug. 8, 2013

(51) Int. Cl.
*H02H 7/18*        (2006.01)
*G05F 1/62*        (2006.01)
*B60L 11/12*       (2006.01)
*B60L 11/14*       (2006.01)
*H02M 3/158*       (2006.01)
*B60L 7/14*        (2006.01)
*B60L 15/20*       (2006.01)
*H02M 1/00*        (2006.01)

(52) U.S. Cl.
CPC .............. *G05F 1/62* (2013.01); *B60L 11/123* (2013.01); *B60L 11/14* (2013.01); *B60L 2210/30* (2013.01); *B60L 2210/40* (2013.01); *H02M 3/1588* (2013.01); *H02M 2001/007* (2013.01); *Y02T 10/6217* (2013.01); *Y02T 10/7005* (2013.01); *Y02T 10/7022* (2013.01); *Y02T 10/7077* (2013.01); *Y02T 10/7241* (2013.01); *B60L 7/14* (2013.01); *B60L 15/2009* (2013.01); *B60L 2210/14* (2013.01); *B60L 2240/12* (2013.01); *B60L 2240/545* (2013.01); *B60L 2240/547* (2013.01); *B60L 2240/549* (2013.01); *Y02T 10/7225* (2013.01)

(58) Field of Classification Search
USPC .................................................. 307/10.1, 10.7
See application file for complete search history.

(56) References Cited

U.S. PATENT DOCUMENTS 7,133,602 B2   11/2006   Yamada
2003/0081440 A1*   5/2003   Komatsu et al. .............. 363/132

(Continued)

FOREIGN PATENT DOCUMENTS

| CN | 101027203 A | 8/2007 |
| JP | A-2005-210779 | 8/2005 |
| JP | A-2010-41752 | 2/2010 |

(Continued)

*Primary Examiner* — Carlos Amaya
(74) *Attorney, Agent, or Firm* — Oliff PLC

(57) ABSTRACT

An ECU is mounted on a vehicle equipped with a converter that can boost a voltage of a power storage device storing electric power for obtaining driving force to output the boosted voltage to a drive load device. The ECU starts boosting at the converter upon satisfaction of at least any of a first condition that a boost request signal Req is received (that is, an output voltage request value of the converter exceeds a voltage Vb of the power storage device) and a second condition that output electric power P of the power storage device is higher than a value obtained by subtracting charge electric power ΔP transiently occurring at the start of boosting from rated electric power Wout (that is, it is predicted that output electric power P will exceed rated electric power Wout in response to the start of boosting).

8 Claims, 5 Drawing Sheets

(56) References Cited

U.S. PATENT DOCUMENTS

2007/0216323 A1    9/2007    Ishikawa et al.
2010/0026218 A1    2/2010    Ogino et al.

FOREIGN PATENT DOCUMENTS

| | | |
|---|---|---|
| JP | A 2010-104139 | 5/2010 |
| JP | A 2010-124662 | 6/2010 |

\* cited by examiner

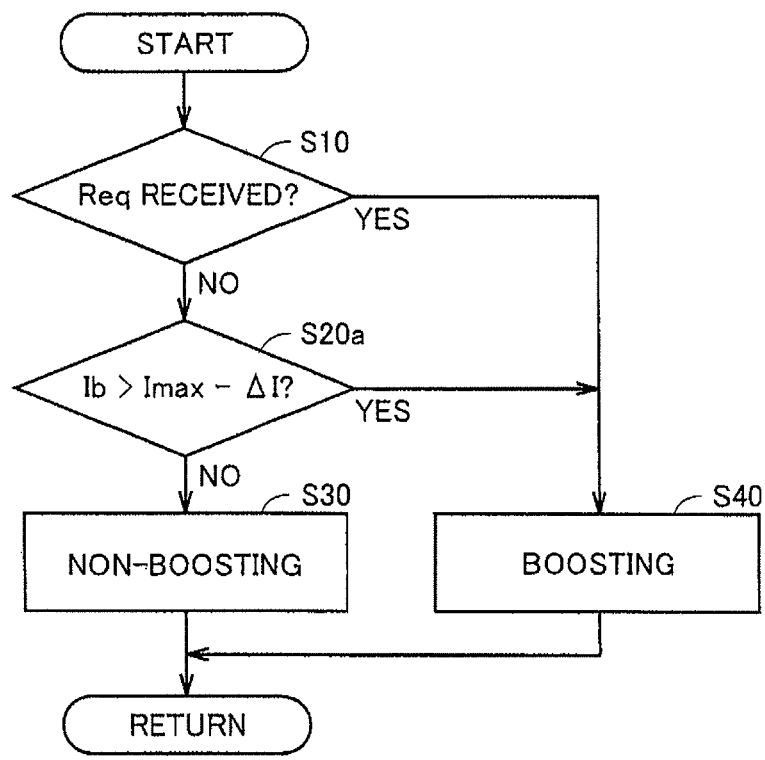

CONTROL APPARATUS AND CONTROL METHOD FOR VEHICLE

TECHNICAL FIELD

The present invention relates to control over a vehicle equipped with a voltage converter that can boost the voltage of a DC power supply to output the boosted voltage to an electrical load.

BACKGROUND ART

In recent years, electrically powered vehicles that can obtain driving force using electric power are in practical use. Some electrically powered vehicles employ a configuration in which a boost converter boosts the voltage of a battery storing electric power for obtaining vehicle driving force to generate a motor operating voltage, and an inverter converts the motor operating voltage into an AC voltage to exert drive control over a motor for driving vehicle wheels.

In electrically powered vehicles that employ such a configuration, Japanese Patent Laying-Open No. 2010-41752 (PTL 1) discloses a control system that determines a boost command value set in response to the target torque and rotation speed of a motor, and, on condition that the boost command value has exceeded the voltage of a DC power supply, causes a boost converter to shift form a non-boosting state to a boosting state. At the shift, battery electric power transitionally increases. In order to prevent electric power equal to or more than the allowable output electric power (rated electric power) of the DC power supply from being output from the DC power supply because of the effect of the transitional increase, the control system disclosed in PTL 1 always makes an addition to a voltage command value in advance by a voltage corresponding to the transitional increase in electric power. A shift from the non-boosting state to the boosting state can thereby be started before a boost command value in actual need exceeds a battery voltage, and the prevention of an output of electric power equal to or more than the rated electric power of the DC power from the DC power supply is achieved.

CITATION LIST

Patent Literature

PTL 1: Japanese Patent Laying-Open No. 2010-41752
PTL 2: Japanese Patent Laying-Open No. 2005-210779

SUMMARY OF INVENTION

Technical Problem

Now, since electric power is the product of a voltage and current, a high voltage and small current may result in electric power that does not exceed rated electric power. In such a case, there is no need for boosting aimed at protecting components (preventing overcurrent).

However, the technology disclosed in PTL 1 merely always additionally raises a voltage command value in advance, which serves as a specific technique for the prevention of an output equal to or more than rated electric power. Therefore, with PTL 1, boosting may be started even when there is no reasonable need for boosting (when there is no need for boosting aimed at outputting torque requested by a user nor boosting aimed at protecting components), and a problem of a greater loss due to an unnecessary operation of a boost converter arises.

The present invention has been made to solve the problems as described above, and an object of the invention is to suitably protect a DC power supply and components connected to the DC power supply while suppressing a loss due to an operation of a voltage converter.

Solution to Problem

A control apparatus according to the present invention controls a vehicle equipped with a voltage converter that can boost a voltage of a DC power supply to output the boosted voltage to an electrical load. The control apparatus includes a determination unit determining whether or not a first condition that an output voltage command value of the voltage converter exceeds a voltage of the DC power supply is satisfied and whether or not a second condition that an output of the DC power supply exceeds a threshold value set in consideration of a transient increase in output of the
DC power supply responsive to a start of boosting by the voltage converter is satisfied; and a control unit controlling the voltage converter such that the voltage converter starts boosting when at least one of the first and second conditions is satisfied.

Preferably, the control unit brings the voltage converter into a non-boosting state when neither of the first and second conditions is satisfied and brings the voltage converter into a boosting state when at least one of the first and second conditions is satisfied.

Preferably, the second condition includes at least any of an electric power condition that output electric power of the DC power supply exceeds an electric power threshold value set in consideration of an amount of transient increase in output electric power of the DC power supply responsive to the start of boosting and a current condition that output current of the DC power supply exceeds a current threshold value set in consideration of an amount of transient increase in output current of the DC power supply responsive to the start of boosting. The control unit controls the voltage converter such that the voltage converter starts the boosting when at least any of the first condition, the electric power condition, and the current condition is satisfied.

Preferably, the vehicle is further equipped with a positive and a negative electrode line for supplying an output voltage of the voltage converter to the electrical load and a capacitor provided between the positive electrode line and the negative electrode line. The electric power threshold value is a value obtained by subtracting charge electric power transiently charged to the capacitor in response to the start of boosting from allowable discharge electric power of the DC power supply. The current threshold value is a value obtained by subtracting charge current transiently charged to the capacitor in response to the start of boosting from allowable current of the voltage converter.

Preferably, the determination unit makes the electric power threshold value and the current threshold value variable in response to a voltage of the DC power supply immediately before the start of boosting.

Preferably, the lower the voltage of the DC power supply immediately before the start of boosting is, the greater value the electric power threshold value and the current threshold value are set to.

Preferably, the voltage converter includes a reactor having one end coupled to a positive electrode of the DC power supply, a first switching element provided between the other end of the reactor and the electrical load, and a second switching element provided between the other end of the reactor and a negative electrode of the DC power supply. When controlling the voltage converter such that the voltage converter is in a boosting state, the control unit sets dead time for preventing the first and second switching elements from simultaneously being in a conduction state and, in consideration of an effect of the dead time, discontinuously increases the output voltage command value at the start of boosting. The transient increase in output of the DC power supply at the start of boosting is a phenomenon caused by discontinuously increasing the output voltage command value.

A control method according to another aspect of the present invention is a control method performed by a control apparatus for a vehicle equipped with a voltage converter that can boost a voltage of a DC power supply to output the boosted voltage to an electrical load. The control method includes the steps of: determining whether or not a first condition that an output voltage command value of the voltage converter exceeds a voltage of the DC power supply is satisfied and whether or not a second condition that an output of the DC power supply exceeds a threshold value set in consideration of a transient increase in output of the DC power supply responsive to a start of boosting by the voltage converter is satisfied; and controlling the voltage converter such that the voltage converter starts boosting when at least one of the first and second conditions is satisfied.

Advantageous Effects of Invention

The present invention sets, as a condition for the start of boosting (condition for causing a shift from a non-boosting state to a boosting state), in addition to the first condition that a target output voltage of a voltage converter exceeds the voltage of a DC power supply, a second, new condition that has taken a transient increase in output of the DC power supply responsive to the start of boosting into consideration, and starts boosting at the time of satisfaction of at least one of the first and second conditions. Therefore, as compared with a case where a condition for the start of boosting is the first condition only and where the first condition itself is altered in consideration of the transient increase in output occurring in response to the start of boosting such that it is easier to satisfy (corresponding to PTL 1), it is possible to suitably protect the DC power supply and components connected to the DC power supply while suppressing a loss due to an unnecessary operation of the power converter.

BRIEF DESCRIPTION OF DRAWINGS

FIG. 8 is a flowchart (No. 2) showing a process procedure of the ECU.

DESCRIPTION OF EMBODIMENTS

Figure 1:
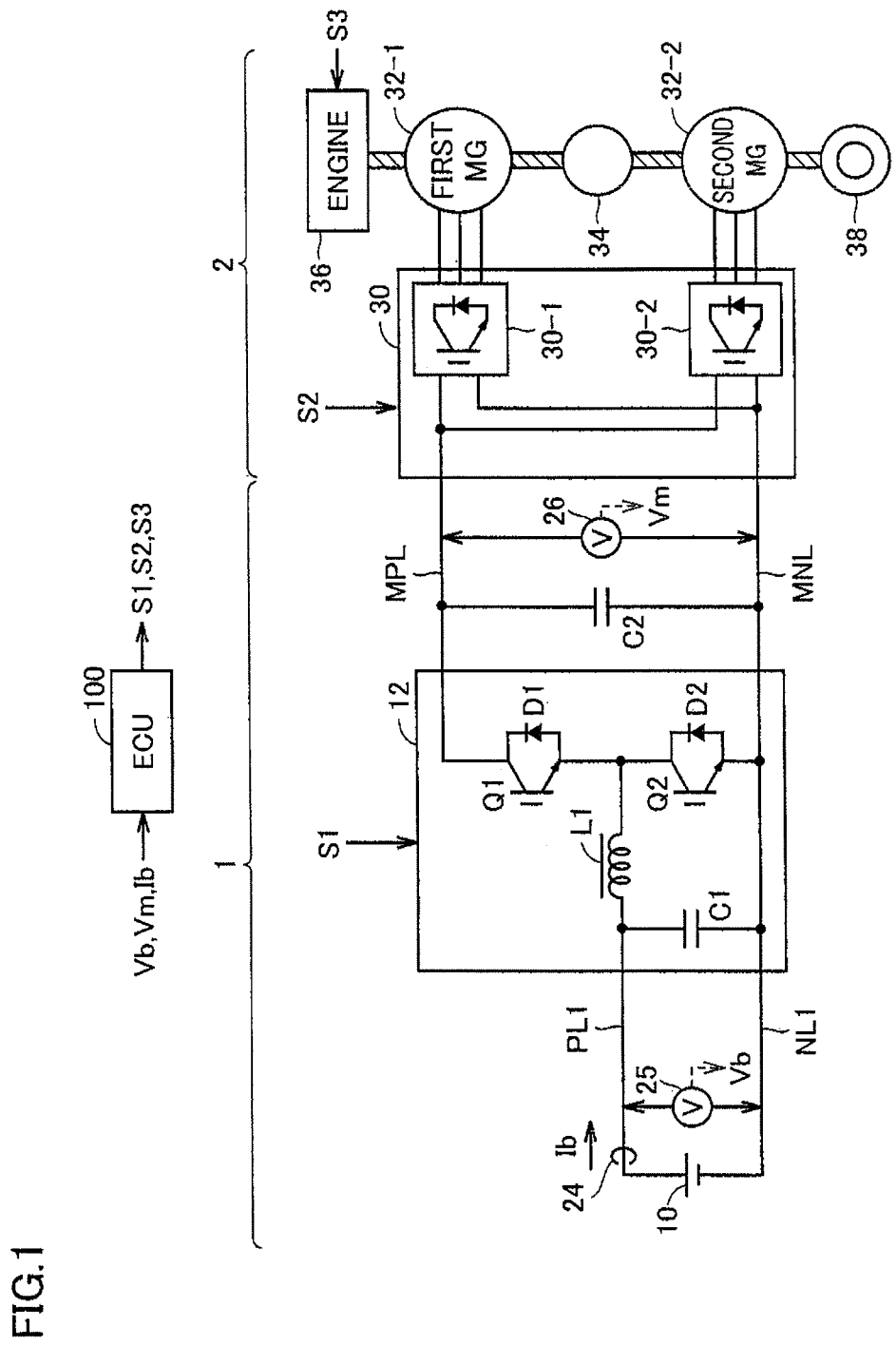
FIG. 1 is an overall block diagram of a vehicle.

Embodiments of the present invention will be hereinafter described in detail with reference to the drawings. In the drawings, the same or corresponding portions have the same reference signs allotted, and a description thereof will not be repeated.

First Embodiment

FIG. 1 is an overall block diagram of a vehicle equipped with a control apparatus according to the present embodiment. Referring to FIG. 1, the vehicle includes a power supply system 1, a driving force generation unit 2, and an Electronic Control Unit (hereinafter referred to as "ECU") 100.

Driving force generation unit 2 includes an inverter 30, a first Motor-Generator (MG) 32-1, a second MG 32-2, a motive power split device 34, an engine 36, and drive wheels 38. First MG 32-1, second MG 32-2, and engine 36 are linked to motive power split device 34. The vehicle is a hybrid vehicle that travels on driving force from at least one of engine 36 and second MG 32-2. It is noted that the control apparatus according to the present invention is applicable at least to electrically powered vehicles in general that can obtain driving force using electric power, without limitation to hybrid vehicles that will be illustrated below. Therefore, the vehicle to which the control apparatus according to the present invention is applicable has no restriction on the presence or absence of an engine and on the number of motor-generators.

Engine 36 is controlled by a control signal S3 from ECU 100. The motive power generated by engine 36 is split by motive power split device 34 into a path for transmission to drive wheels 38 and a path for transmission to first MG 32-1. Using the motive power of engine 36 split by motive power split device 34, first MG 32-1 generates electric power. The electric power generated by first MG 32-1 is supplied to power supply system 1 and second MG 32-2.

Second MG 32-2 generates driving force using at least one of the electric power supplied from power supply system 1 and the electric power generated by first MG 32-1. The driving force of second MG 32-2 is then transmitted to drive wheels 38. It is noted that during, for example, braking of the vehicle, drive wheels 38 drive second MG 32-2, and second MG 32-2 operates as an electric generator. Second MG 32-2 thereby operates as a regenerative brake that converts braking energy into electric power. The electric power generated by second MG 32-2 is then supplied to power supply system 1.

Motive power split device 34 is formed of a planetary gear including a sun gear, pinion gears, a carrier, and a ring gear. The pinion gears engage with the sun gear and the ring gear. The carrier supports the pinion gears such that they are rotatable, and is linked to a crankshaft of engine 36. The sun gear is linked to a rotation shaft of first MG 32-1. The ring gear is linked to a rotation shaft of second MG 32-2.

Inverter 30 includes a first inverter 30-1 and a second inverter 30-2. First inverter 30-1 and second inverter 30-2 are each formed of, for example, a bridge circuit including switching elements for three phases. First inverter 30-1 and second inverter 30-2 are connected to power supply system 1 in parallel with each other. First inverter 30-1 and second inverter 30-2 convert DC power supplied from power supply system 1 into AC power to output the converted power to first MG 32-1 and second MG 32-2, respectively. First inverter 30-1 and second inverter 30-2 also convert AC power generated by first MG 32-1 and second MG 32-2 into DC power, respectively, to output the converted power to power supply system 1.

First inverter 30-1 and second inverter 30-2 perform a switching operation in response to a control signal S2 from ECU 100, thereby driving first MG 32-1 and second MG 32-2.

Power supply system 1 is connected to driving force generation unit 2 (specifically, inverter 30) by a main positive electrode line MPL and a main negative electrode line MNL. Power supply system 1 includes a power storage device 10, a converter 12, and a smoothing capacitor C2.

Smoothing capacitor C2 is connected between main positive electrode line MPL and main negative electrode line MNL and reduces electric fluctuation components included in main positive electrode line MPL and main negative electrode line MNL.

Power storage device 10 is a DC power supply formed of, for example, a secondary battery such as a nickel-metal-hydride or lithium-ion secondary battery. Power storage device 10 has a high output voltage of, for example, more than 200 volts.

Converter 12 includes switching elements Q1, Q2, diodes D1, D2, a reactor L1, 25 and a smoothing capacitor C1. Switching elements Q1, Q2 are connected in series with each other between main positive electrode line MPL and main negative electrode line MNL. As switching elements Q1, Q2, for example, an IGBT (Insulated Gate Bipolar Transistor) can be used.

Reactor L1 is formed of an annular core portion and a coil wound around the outer circumference of the core portion. The coil of reactor L1 has one end connected via a positive electrode line PL1 to a positive terminal of power storage device 10. The coil of reactor L1 has the other end connected to a point between switching element Q1 and switching element Q2. Diode D1 is connected in antiparallel to switching element Q1. That is, given that a direction toward main positive electrode line MPL is a forward direction, diode D1 is connected in parallel to switching element Q1.

Diode D2 is connected in antiparallel to switching element Q2. That is, given that a direction toward reactor L1 is a forward direction, diode D2 is connected in parallel to switching element Q2.

Smoothing capacitor C1 is connected between positive electrode line PL1 and a negative electrode line NL1 and reduces AC components included in a DC voltage between positive electrode line PL1 and negative electrode line NL1.

Switching elements Q1, Q2 of converter 12 are controlled based on a control signal S1 from ECU 100 such that they are in opposite states to each other (that is, Q2 is OFF when Q1 is ON, Q2 is ON when Q1 is OFF). Alternate repetition of a Q1 ON period (a Q2 OFF period) and a Q2 ON period (a Q1 OFF period) controls a voltage between main positive electrode line MPL and main negative electrode line MNL (that is, the voltage across smoothing capacitor C2, hereinafter referred to as "voltage Vm") such that the voltage is not less than the output voltage of power storage device 10.

Further, the vehicle is equipped with a current sensor 24 and voltage sensors 25, 26. Current sensor 24 detects current that power storage device 10 carries (hereinafter referred to as "current Ib"). Voltage sensor 25 detects the voltage across power storage device 10 (hereinafter referred to as "voltage Vb"). Voltage sensor 26 detects an output voltage of converter 12, that is, voltage Vm as described above. Each of these sensors outputs a detection result to ECU 100.

ECU 100 includes a built-in CPU (Central Processing Unit) and a built-in memory, both not shown in the drawing, and is configured to execute predetermined arithmetic processing based on a map and a program stored in the memory.

Based on an amount of operation of an accelerator by a driver, vehicle speed, and the like, ECU 100 calculates vehicle request power Preq requested of the vehicle as a whole, and based on vehicle request power Preq, generates control signal S1 for driving converter 12, control signal S2 for driving inverter 30, and control signal S3 for driving engine 36. ECU 100 then outputs control signals S1, S2, and S3 to converter 12, inverter 30, and engine 36, respectively.

Figure 2:
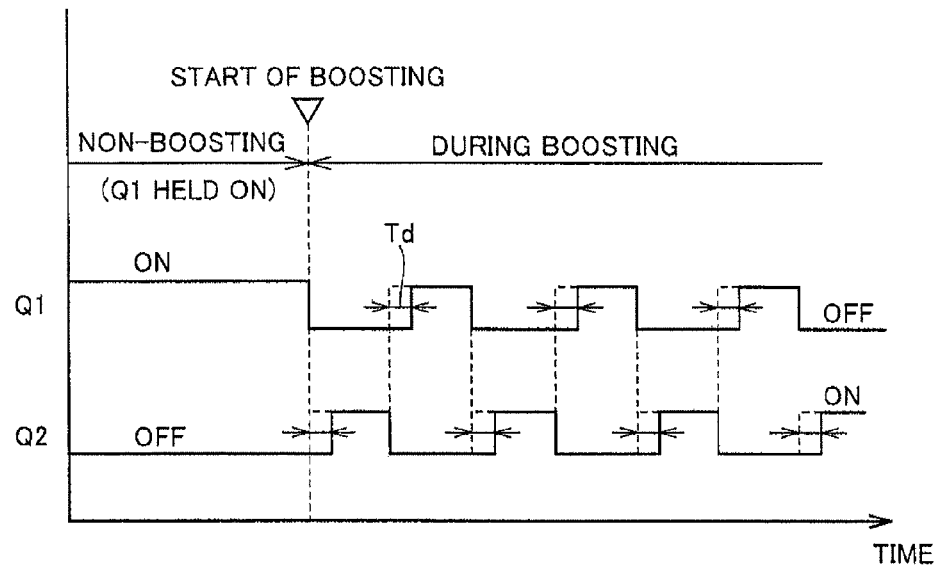
FIG. 2 shows the relation between the operation of switching elements of a converter and boosting.

FIG. 2 shows the relation between the operation of switching elements Q1, Q2 of converter 12 and boosting. When switching element Q1 is held ON (switching element Q2 is held OFF), boosting is not performed by converter 12, which is a non-boosting state. In this non-boosting state, voltage Vb output by power storage device 10 is directly output between main positive electrode line MPL and main negative electrode line MNL. It is noted that the non-boosting state corresponds to when a duty ratio Duty is 100 percent, which will be described later.

In contrast, alternately turning switching elements Q1, Q2 ON at a predetermined period results in that boosting is performed by converter 12, which is a boosting state. In this boosting state, in response to duty ratio Duty (a ratio of the Q1 ON period to the sum of the Q1 ON period and the Q2 ON period), voltage Vb is boosted to be output between main positive electrode line MPL and main negative electrode line MNL. That is, voltage Vm, which is the output voltage of converter 12, is higher than voltage Vb, which is the input voltage of converter 12. It is noted that in the present embodiment, the boost ratio is by a factor of one (non-boosting) when Duty=100%, increases in response to a decrease in Duty, and is by a factor of two (maximum) when Duty=50%.

In the boosting state, dead time Td is set, which is a period during which both of switching elements Q1, Q2 are simultaneously OFF. Setting dead time Td prevents the occurrence of a moment at which switching elements Q1, Q2 are simultaneously ON, which results in a short circuit. It is noted that FIG. 2 shows an example in which an OFF operation (change from ON to OFF) of any one of switching elements Q1, Q2 is prioritized, and an ON operation of the other one is delayed by dead time Td relative to an ON operation of the one.

When an amount of voltage boosted by converter 12 is set to a very low value (for example, Duty=99%) at the start of boosting (at a shift from the non-boosting state from the boosting state), boosting as commanded may not be able to be performed depending on the direction of current that converter 12 carries, because of the effect of dead time Td. In order to avoid such a problem, in the present embodiment, a voltage command value Vmcom (command value for voltage Vm) is discontinuously (discretely) increased at the start of boosting, rather than continuously increased.

Figure 3:
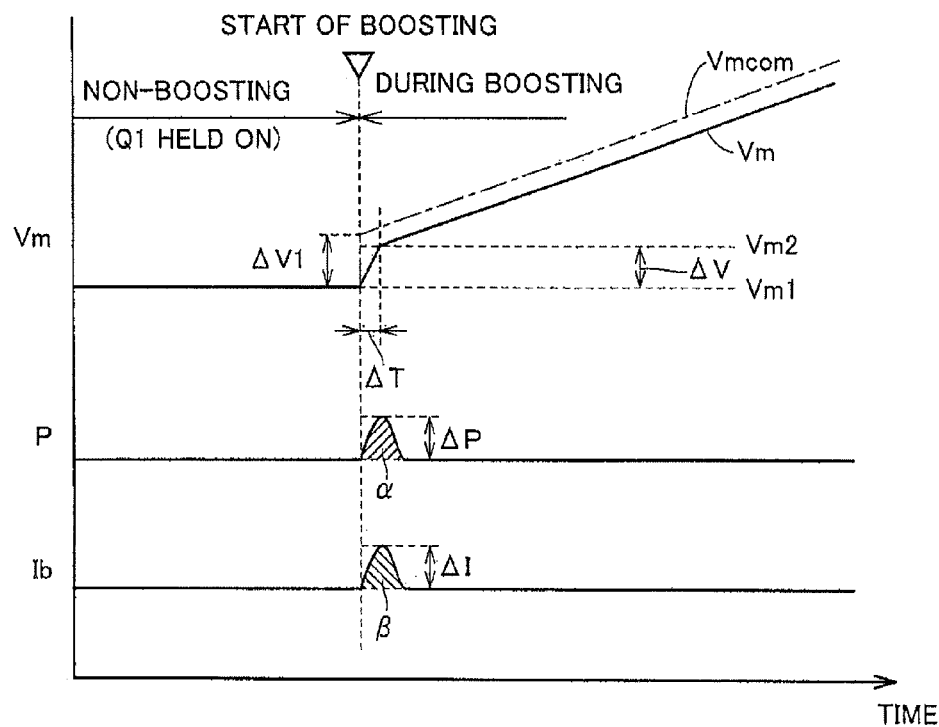
FIG. 3 shows a voltage Vm and amounts of increase in output electric power P and in current Ib.

FIG. 3 schematically shows voltage Vm and amounts of increase in output electric power P and in current Ib at the start of boosting. It is noted that output electric power P is electric power output from power storage device 10 (in units of watt).

As described above, voltage command value Vmcom is discontinuously increased at the start of boosting. That is, as shown in FIG. 3, at the start of boosting, voltage command value Vmcom is discretely increased from voltage Vm1 to a value greater than voltage Vm1 by a predetermined value $\Delta V1$. This produces the effect of rapidly increasing actual voltage Vm in a little time from voltage Vm1 to voltage Vm2$\Delta T$. It is noted that voltage Vm1 has the same value as that of voltage Vm immediately before the start of boosting, that is, voltage Vb. This rapid increase in voltage Vm causes smoothing capacitor C2 connected between main positive electrode line MPL and main negative electrode line MNL to be charged with electric charges, and electric power corresponding to the amount charged is taken from power storage device 10. This produces the effect of transiently increasing output electric power P by predetermined electric power $\Delta P$ and also transiently increasing current Ib by predetermined current $\Delta I$. In this way, predetermined electric power $\Delta P$ and predetermined current ΔI correspond to the electric power and current charged to smoothing capacitor C2, and therefore, predetermined electric power ΔP is hereinafter also referred to as "charge electric power ΔP", and predetermined current ΔI as "charge current ΔI".

This charge electric power ΔP is added to electric power consumed at a motor such as second MG 32-2 and then output from power storage device 10. Therefore, starting boosting with actual output electric power P nearly reaching the rated electric power of power storage device 10 (the magnitude of electric power allowed to be discharged from power storage device 10, hereinafter referred to as "rated electric power Wout") can result in that output electric power P exceeds rated electric power Wout and serves as a factor in the degradation of power storage device 10. In the same manner, starting boosting with current Ib nearly reaching the allowable current value of components on a current-carrying path between power storage device 10 and inverter 30 (for example, reactor L1, switching elements Q1, Q2 and the like that form converter 12) can result in that current Ib exceeds the allowable current value and serves as a factor in the failure of current-carrying components.

In order to solve this problem, ECU 100 according to the present embodiment starts boosting in consideration of the above-described amounts of transient increase in output electric power P and/or in current Ib (charge electric power ΔP, charge current ΔI) that occur at the start of boosting. That is, conventional boost control obtains torque requested by a user based on vehicle speed, an amount of operation of an accelerator pedal, and the like, obtains a voltage request value Vmreq responsive to the torque requested by the user, assumes that there is a boost request by the user when voltage request value Vmreq exceeds voltage Vb (voltage Vm at the time of non-boosting), and then starts boosting. In contrast, the present embodiment sets, as a condition for the start of boosting, in addition to a conventional voltage-related condition that there is a boost request by a user, a new electric-power-related condition that output electric power P at the start of boosting (that is, a value obtained by adding charge electric power ΔP to output electric power P immediately before the start of boosting) exceeds rated electric power Wout, and starts boosting at the time of satisfaction of at least any one of the conditions. That is, the present embodiment sets the voltage-related condition and the electric-power-related condition independently, and starts boosting at the time of satisfaction of any one of the conditions. Therefore, even when there is no boost request by a user (when the voltage-related condition is not satisfied), boosting is started in advance when it is predicted that output electric power P at the start of boosting will exceed rated electric power Wout (when the electric-power-related condition is satisfied). This is the most characteristic feature of the present embodiment.

Figure 4:
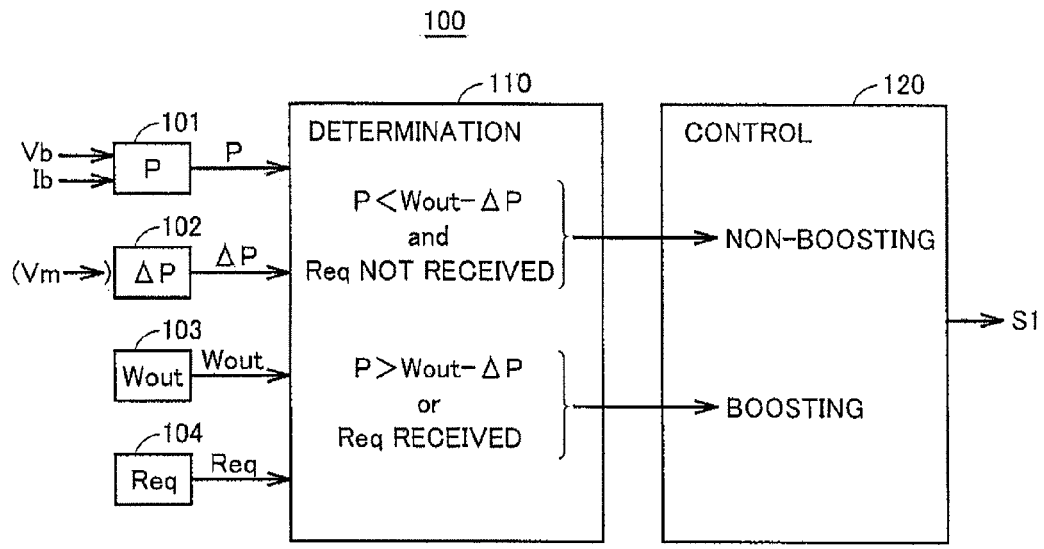
FIG. 4 is a functional block diagram (No. 1) of an ECU.

FIG. 4 is a functional block diagram of a portion of ECU 100 relating to control over converter 12. It is noted that each functional block shown in FIG. 4 may be realized by hardware (such as an electric circuit) or may be realized by software (such as execution of a program).

ECU 100 includes calculation units 101-103, a generation unit 104, a determination unit 110, and a control unit 120.

Calculation unit 101 calculates output electric power P (=Vb·Ib) of power storage device 10 based on voltage Vb and current Ib and outputs a calculation result to determination unit 110.

Calculation unit 102 calculates the above-described charge electric power ΔP and outputs it to determination unit 110. Charge electric power ΔP may be calculated through an experiment or the like and stored in advance, or may be calculated in response to, for example, voltage Vm. In the present embodiment, charge electric power ΔP will be described as a value (fixed value) that is the maximum value of electric power taken from power storage device 10 to smoothing capacitor C2 at the start of boosting and is obtained through an experiment or the like and stored in advance. It is noted that charge electric power ΔP corresponds to the area of region a shown in FIG. 3.

Calculation unit 103 calculates rated electric power Wout of power storage device 10 based on, for example, the temperature of power storage device 10.

Generation unit 104 determines whether or not there is a boost request from a user, based on vehicle speed, an amount of operation of an accelerator pedal, and the like. As described above, based on vehicle speed, an amount of operation of an accelerator pedal, and the like, generation unit 104 obtains torque requested by the user, obtains voltage request value Vmreq responsive to the torque requested by the user, and determines that there is a boost request by a user when that voltage request value Vmreq exceeds voltage Vb (voltage Vm at the time of non-boosting). Determining that there is a boost request by a user, generation unit 104 generates a boost request signal Req and outputs it to determination unit 110.

Determination unit 110 determines whether or not the condition for the start of boosting is satisfied, based on output electric power P, charge electric power ΔP, rated electric power Wout, and boost request signal Req. Determination unit 110 determines that the condition for the start of boosting is satisfied upon satisfaction of at least any of a first condition that boost request signal Req is received (that is, voltage request value Vmreq exceeds voltage Vb) and a second condition that output electric power P is higher than a value obtained by subtracting charge electric power ΔP from rated electric power Wout (that is, it is predicted that output electric power P will exceed rated electric power Wout in response to the start of boosting). In contrast, determination unit 110 determines that the condition for the start of boosting is not satisfied when neither of the first and second conditions is satisfied. Determination unit 110 outputs a determination result to control unit 120.

Control unit 120 controls converter 12 such that it is in the non-boosting state when the condition for the start of boosting is not satisfied. That is, control unit 120 generates control signal S1 such that switching element Q1 is held ON (switching element Q2 is held OFF), and outputs the generated signal to converter 12. On the other hand, control unit 120 causes converter 12 to shift from the non-boosting state to the boosting state when the condition for the start of boosting is satisfied. In doing so, as described above, control unit 120 discontinuously (discretely) increases voltage command value Vmcom directed by control signal S1. Actual voltage Vm is thereby accurately followed by voltage command value Vmcom even when dead time Td is set.

Figure 5:
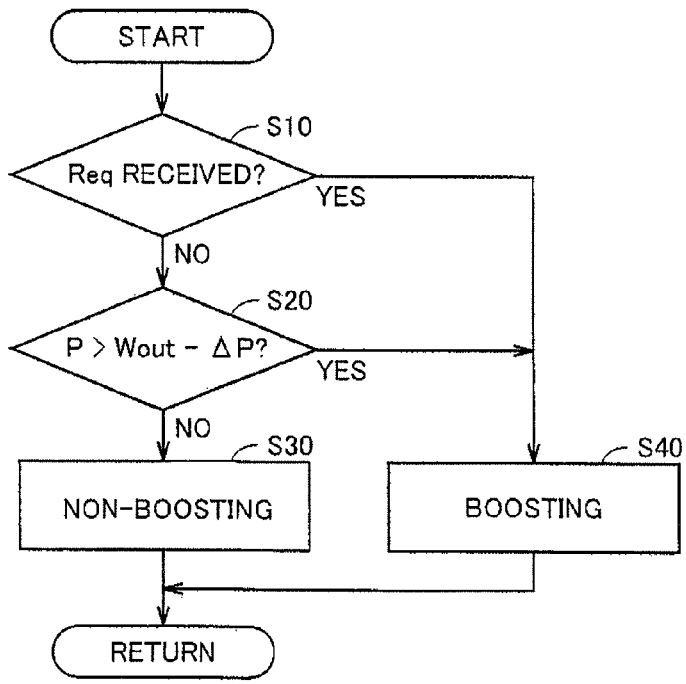
FIG. 5 is a flowchart (No. 1) showing a process procedure of the ECU.

FIG. 5 is a flowchart showing a process procedure of ECU 100 for realizing the above-described functions. Each step (hereinafter step is abbreviated as "S") of the flowchart set forth below may be realized by hardware or may be realized by software, as described above.

In S10, ECU 100 determines whether or not boost request signal Req is received. If boost request signal Req is received (YES in S10), then the process proceeds to S40. If not (NO in S10), then the process proceeds to S20.

In S20, ECU 100 determines whether or not output electric power P exceeds a value obtained by subtracting charge electric power ΔP from rated electric power Wout (P>Wout−ΔP is satisfied). If P>Wout−ΔP is satisfied (YES in S20), then the process proceeds to S40. If not (NO in S20), then the process proceeds to S30.

In S30, ECU 100 controls converter 12 such that it is in the non-boosting state. That is, switching element Q1 is held ON.

In S40, ECU 100 controls converter 12 such that it is in the boosting state. If converter 12 is in the non-boosting state immediately before this process, then, as described above, voltage command value Vmcom is discretely increased by predetermined value ΔV1, and subsequently, voltage command value Vmcom is gradually allowed to follow voltage request value Vmreq.

As above, ECU 100 according to the present embodiment sets, in addition to the first condition (a voltage-related condition corresponding to a conventional condition) that boost request signal Req is received, a second, new condition (an electric-power-related condition) that output electric power P is higher than a value obtained by subtracting charge electric power ΔP from rated electric power Wout, determines that the condition for the start of boosting is satisfied upon satisfaction of at least one of the first and second conditions, and then starts boosting at converter 12. Therefore, the present embodiment can start boosting in a necessary and sufficient manner as compared with, for example, a conventional case where the condition for the start of boosting is only the first condition or a conventional case where the first conditions is altered such that it is easier to satisfy (for example, a case where voltage request value Vmreq is set to a higher value than a user request, in consideration of charge electric power ΔP). That is, it is possible to suppress a loss of converter 12 and protect power storage device 10 as appropriate while meeting a request from a user.

Modification of First Embodiment

In the first embodiment above, charge electric power ΔP was described as a fixed value; however, as already described, charge electric power ΔP may be calculated as a variable value. A method of calculating charge electric power ΔP will be described below in detail.

Charge electric power ΔP is an amount of change in an amount of power stored in smoothing capacitor C2 (=(½)·C·(Vm)²), and therefore, even with the same amount of increase in voltage Vm, the higher voltage Vm is, the greater charge electric power ΔP is. To make this point reflected in charge electric power ΔP, charge electric power ΔP may be calculated by the following equation (1):

$$\Delta P = (1/2) \cdot C \cdot \{(Vm1 + \Delta V)^2 - (Vm1)^2\} / \Delta T \quad \text{Equation (1)}$$

where "C" represents the capacitor capacitance, "Vm1" represents voltage Vm immediately before the start of boosting (that is, voltage Vb immediately before the start of boosting), "ΔV" represents an amount of increase in voltage Vm at the start of boosting, and "ΔT" represents time required for voltage Vm to increase by amount of increase ΔV at the start of boosting (see FIG. 3).

Since capacitor capacitance C depends on the specifications of smoothing capacitor C2, for example, obtaining time ΔT and amount of increase ΔV in advance through an experiment or the like enables calculation of charge electric power ΔP by detection of "voltage Vm1" immediately before the start of boosting with a use of voltage sensor 26, followed by substitution of the detected voltage into Equation (1). It is noted that ΔV may be detected by voltage sensor 26.

In this way, substituting a detected value of voltage Vm1 into Equation (1) to calculate charge electric power ΔP makes it possible that the higher voltage Vm1 is, the greater value charge electric power ΔP is set to.

Figure 6:
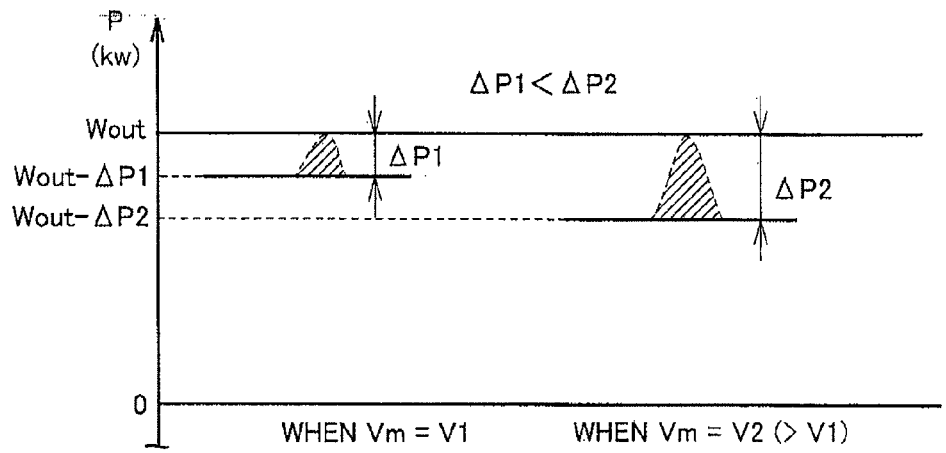
FIG. 6 shows the relation between voltage Vm and a charge voltage ΔP.

FIG. 6 shows the relation between voltage Vm and charge voltage ΔP. A comparison of charge voltage ΔP1 when voltage Vm=V1 and charge voltage ΔP2 when voltage Vm=V2 (>V1) shows that a relation of ΔP1<ΔP2 is satisfied. That is, the higher voltage Vm immediately before the start of boosting is, the greater the electric power actually charged to smoothing capacitor C2 is, and according to equation (1), charge electric power ΔP can be brought closer to the electric power actually charged to smoothing capacitor C2. The accuracy of calculation of charge electric power ΔP is thereby increased, and the lower voltage Vm is, the greater value a threshold value (=Wout−ΔP) used for comparison with output electric power P in the process in S20 of FIG. 5 can be set to. Using FIG. 6 for illustration, a threshold value when voltage Vm=V1 (<V2) (=Wout−ΔP1) can be set to a value greater than a threshold value when voltage Vm=V2 (=Wout−ΔP2). Therefore, boosting can be started at more appropriate timing through prevention of unnecessary boosting, and a further reduction in loss is made possible.

Second Embodiment

In the first embodiment above, the condition for compliance with the rated electric power of power storage device 10 was set as the second condition for the start of boosting. In contrast, in a second embodiment, the condition for compliance with the rated current of converter 12 (an allowable value of current that converter 12 carries, hereinafter also referred to as "rated current Imax") is set as the second condition for the start of boosting. Other structure, function, and process are the same as those in the first embodiment above, and a detailed description thereof will not be repeated herein.

Figure 7:
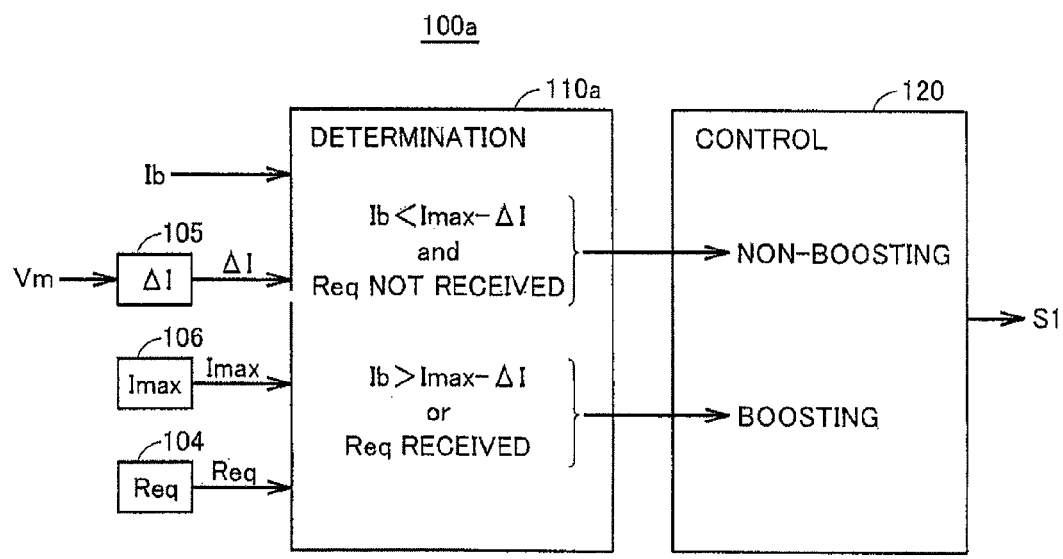
FIG. 7 is a functional block diagram (No. 2) of the ECU.

FIG. 7 is a functional block diagram of an ECU 100a according to the second embodiment. It is noted that among the functional blocks shown in FIG. 7, the functional blocks having the same reference signs as the above-described functional blocks shown in FIG. 4 allotted have already been described, and therefore, a detailed description thereof will not be repeated herein.

ECU 100a includes a calculation unit 105, a memory unit 106, generation unit 104, a determination unit 110a, and control unit 120.

Calculation unit 105 calculates the above-described charge current ΔI and outputs it to determination unit 110a. Charge current ΔI may be calculated through an experiment or the like and stored in advance or may be calculated in response to, for example, voltage Vm. In the present embodiment, charge current ΔI will be described as a value (fixed value) that is the maximum value of current taken from power storage device 10 to smoothing capacitor C2 at the start of boosting and is obtained through an experiment or the like and stored in advance. It is noted that charge current AI corresponds to the area of region β shown in FIG. 3.

Memory unit 106 stores rated current Imax of converter 12 and outputs rated current Imax to determination unit 110a as necessary. It is noted that rated current Imax is set to suit a component having the lowest allowable current value among the components making up converter 12, such as reactor L1 and switching elements Q1, Q2. It is noted that although rated current Imax of converter 12 is described here, the allowable current values of all of current-carrying components provided between power storage device 10 and inverter 30 may be taken into consideration.

Determination unit 110a determines whether or not the condition for the start of boosting is satisfied, based on current Ib (a value detected by current sensor 24), charge current ΔI, rated current Imax, and boost request signal Req. Determination unit 110a determines that the condition for the start of boosting is satisfied upon satisfaction of at least any of a first condition that boost request signal Req is received and a second condition that current Ib is higher than a value obtained by subtracting charge current ΔI from rated current Imax (that is, it is predicted that converter 12 will carry current exceeding rated current Imax in response to the start of boosting). In contrast, determination unit 110a determines that the condition for the start of boosting is not satisfied when neither of the first and second conditions is satisfied. Determination unit 110a outputs a determination result to control unit 120.

FIG. 8 is a flowchart showing a process procedure of ECU 100a for realizing the above-described functions. It is noted that among the steps shown in FIG. 8, the steps having the same numbers as the above-described steps shown in FIG. 5 allotted have already been described, and therefore, a detailed description thereof will not be repeated herein. In S20a, ECU 100 determines whether or not current Ib exceeds a value obtained by subtracting charge current ΔI from rated current Imax (Ib>Imax−ΔI is satisfied). If Ib>Imax−ΔI is satisfied (YES in S20a), then the process proceeds to S40. If not (NO in S20a), then the process proceeds to S30.

As above, ECU 100a according to the present embodiment sets, in addition to the first condition that boost request signal Req is received (a voltage-related condition corresponding to a conventional condition), a second, new condition that current Ib is higher than a value obtained by subtracting charge current ΔI from rated current Imax (a current-related condition), determines that the condition for the start of boosting is satisfied upon satisfaction of at least one of the first and second conditions, and then starts boosting at converter 12. Therefore, as with the first embodiment above, the present embodiment can start boosting in a necessary and sufficient manner as compared with, for example, the case where the condition for the start of boosting is only the first condition or the case where the first conditions is altered such that it is easier to satisfy in consideration of charge current ΔI. That is, it is possible to suppress a loss of converter 12 and protect power storage device 10 as appropriate while meeting a request from a user.

First Modification of Second Embodiment

In the second embodiment above, charge current ΔI was described as a fixed value; however, as already described, charge current ΔI may be calculated as a variable value. For instance, charge current ΔI may be calculated by the following equation (2):

$$\Delta I = (1/2) \cdot C \cdot \{(Vm1+\Delta V)^2 - (Vm1)^2\}/\Delta T/Vm1 \quad \text{Equation (2)}$$

that is, a value that is obtained by dividing charge electric power ΔP, which was obtained through Equation (1) above, by voltage Vm1 can be calculated as charge current ΔI.

In this way, substituting a detected value of voltage Vm1 into equation (2) to calculate charge current ΔI makes it possible that the higher voltage Vm1 is, the greater value charge current ΔI is set to, and charge current ΔI can be brought closer to an actual value. The accuracy of calculation of charge current ΔI is thereby increased, and boosting can be started at more appropriate timing, and therefore, unnecessary boosting can be prevented to achieve a further reduction in loss.

Second Modification of Second Embodiment

The second condition of the condition for the start of boosting may employ a combination of the condition for compliance with the rated electric power of power storage device 10, which was described in the first embodiment, and the condition for compliance with the rated current of converter 12, which was described in the second embodiment. In this case, boosting can be started at the time of satisfaction of at least any condition among the condition that boost request signal Req is received, the condition for compliance with the rated electric power of power storage device 10, and the condition described in the second embodiment for compliance with the rated current of converter 12.

It should be understood that the embodiments disclosed herein are illustrative and non-restrictive in every respect. The scope of the present invention is defined by the terms of the claims rather than the description above, and is intended to include any modifications within the scope and meaning equivalent to the terms of the claims.

Reference Signs List 1 power supply system; 2 driving force generation unit; 10 power storage device; 12 converter; 24 current sensor; 25, 26 voltage sensor; 30 inverter; 30-1 first inverter; 30-2 second inverter; 34 motive power split device; 36 engine; 38 drive wheel; 100 ECU; 101-103, 105 calculation unit; 104 generation unit; 106 memory unit; 110, 110a determination unit; 120, 120a control unit; C1, C2 smoothing capacitor; D1, D2 diode; L1 reactor; MNL main negative electrode line; MPL main positive electrode line; NL1 negative electrode line; PL1 positive electrode line; Q1, Q2 switching element.

The invention claimed is:

1. A control apparatus for a vehicle equipped with a voltage converter that can boost a voltage of a DC power supply to output the boosted voltage to an electrical load, the control apparatus comprising:
   a determination unit determining
      whether or not a first condition that an output voltage command value of said voltage converter exceeds a voltage of said DC power supply is satisfied and
      whether or not a second condition that an output of said DC power supply exceeds a threshold value set in consideration of a transient increase in output of said DC power supply responsive to a start of boosting by said voltage converter is satisfied; and
   a control unit controlling said voltage converter such that said voltage converter starts boosting when at least one of said first and second conditions is satisfied.

2. The control apparatus for a vehicle according to claim 1, wherein
   said control unit brings said voltage converter into a non-boosting state when neither of said first and second conditions is satisfied and brings said voltage converter into a boosting state when at least one of said first and second conditions is satisfied.

3. The control apparatus for a vehicle according to claim 1, wherein
   said second condition includes at least any of
      an electric power condition that output electric power of said DC power supply exceeds an electric power threshold value set in consideration of an amount of transient increase in output electric power of said DC power supply responsive to said start of boosting and
      a current condition that output current of said DC power supply exceeds a current threshold value set in consideration of an amount of transient increase in output current of said DC power supply responsive to said start of boosting and
   said control unit controls said voltage converter such that said voltage converter starts said boosting when at least any of said first condition, said electric power condition, and said current condition is satisfied.

4. The control apparatus for a vehicle according to claim 3, wherein
   said vehicle is further equipped with a positive and a negative electrode line for supplying an output voltage of said voltage converter to said electrical load and a capacitor provided between said positive electrode line and said negative electrode line, said electric power threshold value is a value obtained by subtracting charge electric power transiently charged to said capacitor in response to said start of boosting from allowable discharge electric power of said DC power supply, and said current threshold value is a value obtained by subtracting charge current transiently charged to said capacitor in response to said start of boosting from allowable current of said voltage converter.

5. The control apparatus for a vehicle according to claim 4, wherein said determination unit makes said electric power threshold value and said current threshold value variable in response to a voltage of said DC power supply immediately before said start of boosting.

6. The control apparatus for a vehicle according to claim 5, wherein the lower said voltage of said DC power supply immediately before said start of boosting is, the greater value said electric power threshold value and said current threshold value are set to.

7. The control apparatus for a vehicle according to claim 1, wherein said voltage converter includes a reactor having one end coupled to a positive electrode of said DC power supply, a first switching element provided between the other end of said reactor and said electrical load, and a second switching element provided between said other end of said reactor and a negative electrode of said DC power supply, when controlling said voltage converter such that said voltage converter is in a boosting state, said control unit sets dead time for preventing said first and second switching elements from simultaneously being in a conduction state and, in consideration of an effect of said dead time, discontinuously increases said output voltage command value at said start of boosting, and the transient increase in output of said DC power supply at said start of boosting is a phenomenon caused by discontinuously increasing said output voltage command value.

8. A control method performed by a control apparatus for a vehicle equipped with a voltage converter that can boost a voltage of a DC power supply to output the boosted voltage to an electrical load, the control method comprising the steps of:

determining whether or not a first condition that an output voltage command value of said voltage converter exceeds a voltage of said DC power supply is satisfied and whether or not a second condition that an output of said DC power supply exceeds a threshold value set in consideration of a transient increase in output of said DC power supply responsive to a start of boosting by said voltage converter is satisfied; and controlling said voltage converter such that said voltage converter starts boosting when at least one of said first and second conditions is satisfied.

* * * * *